US 12,486,208 B2

(12) United States Patent
Long et al.

(10) Patent No.: US 12,486,208 B2
(45) Date of Patent: Dec. 2, 2025

(54) ISOBUTANOL PRODUCTION PROCESS

(71) Applicants: UOP LLC, Des Plaines, IL (US); CHINA PETROLEUM & CHEMICAL CORPORATION, Beijing (CN)

(72) Inventors: Richard Long, Katy, TX (US); Tian Ruan, Katy, TX (US); Jinbiao Guo, Katy, TX (US)

(73) Assignees: UOP LLC, Des Plaines, IL (US); China Petroleum & Chemical Corporation, Beijing (CN)

(*) Notice: Subject to any disclaimer, the term of this patent is extended or adjusted under 35 U.S.C. 154(b) by 485 days.

(21) Appl. No.: 18/040,999

(22) PCT Filed: Sep. 25, 2020

(86) PCT No.: PCT/US2020/052737
§ 371 (c)(1),
(2) Date: Feb. 8, 2023

(87) PCT Pub. No.: WO2022/066168
PCT Pub. Date: Mar. 31, 2022

(65) Prior Publication Data
US 2023/0265030 A1 Aug. 24, 2023

(51) Int. Cl.
C07C 29/34 (2006.01)
C07C 29/78 (2006.01)
C07C 29/80 (2006.01)

(52) U.S. Cl.
CPC .............. *C07C 29/34* (2013.01); *C07C 29/78* (2013.01); *C07C 29/80* (2013.01)

(58) Field of Classification Search
CPC ......... C07C 29/34; C07C 29/78; C07C 29/80; C07C 29/32
See application file for complete search history.

(56) References Cited

U.S. PATENT DOCUMENTS

| 2,564,130 | A | 8/1951 | Schreyer |
| 5,095,156 | A | 3/1992 | Radlowski et al. |
| 5,767,166 | A | 6/1998 | Antonelli et al. |
| 2013/0225879 | A1 | 8/2013 | Temel et al. |
| 2020/0039905 | A1 | 2/2020 | Long et al. |

FOREIGN PATENT DOCUMENTS

| CN | 103370295 A | 10/2013 |
| WO | 2019168527 A1 | 9/2019 |

OTHER PUBLICATIONS

International Preliminary Report on Patentability from corresponding PCT application No. PCT/US2020/052737 issued Mar. 28, 2023.
International Search Report from corresponding PCT application No. PCT/US2020/052737 mailed Jun. 24, 2021.
Written Opinion from corresponding PCT application No. PCT/US2020/052737 mailed Jun. 24, 2021.

*Primary Examiner* — Deborah D Carr

(57) ABSTRACT

Processes for making isobutanol are described. The processes involve a first reaction between methanol and ethanol in the presence of a first catalyst to produce an alcohol mixture containing propanol, isobutanol and n-butanol, and a second reaction between the produced propanol and synthesis gas in the presence of a second catalyst to produce isobutanol. The methanol and ethanol produced in the second reaction are recycled and used in the first reaction, and the unreacted propanol is recycled and used in the second reaction.

20 Claims, 2 Drawing Sheets

ISOBUTANOL PRODUCTION PROCESS

This application is a U.S. National Phase under 35 U.S.C. § 371 of International Application No. PCT/US2020/052737 filed Sep. 25, 2020, which is incorporated herein by reference in its entirety.

BACKGROUND

Ethanol is used primarily as a gasoline additive for improving combustion efficiency. Isobutanol can be considered as a second-generation biofuel. Isobutanol is an organic solvent and a feedstock in the manufacturing of isobutyl acetate and isobutyl esters. It can also be blended directly with gasoline to improve octane number and combustion efficiency or used as a neat alternative fuel. Isobutanol has relatively higher energy density, and lower volatility compared to ethanol. In addition, it does not readily absorb water from air, preventing the corrosion of engines and pipelines. It also has a higher octane number than ethanol, resulting in less knocking in engines.

Although isobutanol has many potential uses, its synthesis is currently limited. Isobutanol can be produced through the carbonylation of propylene. This process involves reacting propylene with carbon monoxide and hydrogen to generate isobutyraldehyde, and then hydrogenating the isobutyraldehyde to isobutanol. For example, U.S. Pat. No. 2,564,130 discloses a process for the manufacture of n-butanol and isobutanol from a mixture containing propylene, CO, and $H_2$ at 225-300° C. in the presence of a cobalt-containing catalyst. Although this carbonylation process is currently used for manufacturing butanol, it is not energy efficient due to the high energy needed for the production of propylene and synthesis gas (syngas). It is also expensive because of the cost of propylene. Further, when isobutanol is used as a gasoline additive, demand for it is expected to increase the demand for propylene significantly, making the process even more expensive.

Alternatively, synthesis of isobutanol directly from more abundant and less-expensive syngas has been investigated extensively. The syngas, containing carbon monoxide and hydrogen, is mainly produced from reforming or partial oxidation of natural gas and light hydrocarbons, or gasification of coal and biomass at high temperatures. It can also be produced from gasification of municipal solid waste. The carbon monoxide and hydrogen react at high temperatures and high pressures to produce methanol and isobutanol on alkali promoted ZnO and CuO—ZnO based catalysts, with methane and light hydrocarbons as the main by-products. For example, U.S. Pat. No. 5,767,166 discloses a process for producing isobutanol from syngas on alkali promoted Zn—Cr oxide catalysts in one reactor. A similar process is disclosed in CN Pat. Pub. No. 103,272,609 in which alkali and rare earth oxide promoted CuO—ZnO—$ZrO_2$ catalysts were used.

Although the direct isobutanol synthesis from syngas has been extensively investigated, it is often associated with poor isobutanol selectivity and productivity. During operation, lower temperature results in higher methanol selectivity, while higher temperature tends to produce more methane and light hydrocarbons. Consequently, high isobutanol selectivity and yield are difficult to achieve on the alkali promoted ZnO and CuO—ZnO catalysts.

Therefore, it would be desirable to have a process which can overcome the above obstacles and achieve high isobutanol productivity.

DESCRIPTION

Figure 1:
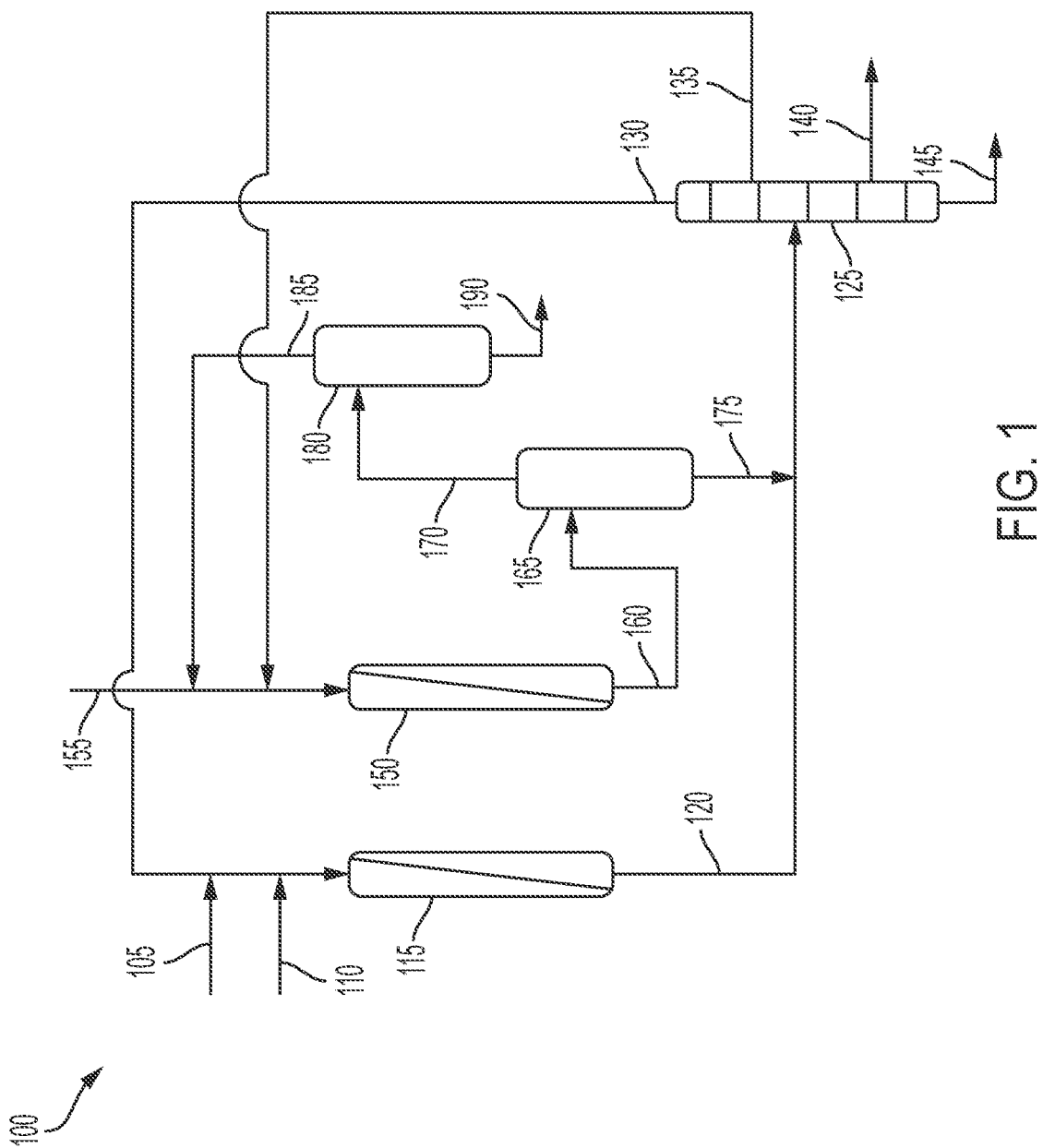
FIG. 1 is an illustration of one embodiment of the process of making isobutanol from methanol, ethanol, propanol, and synthesis gas of the present invention.

A new route for isobutanol synthesis has been developed. It involves a first reaction between methanol and ethanol in the presence of a first catalyst to produce an alcohol mixture containing propanol, isobutanol and n=butanol, and a second reaction between the propanol produced in the first reaction and synthesis gas (syngas) in the presence of a second catalyst to produce isobutanol. The synthesis gas is a gas mixture consisting hydrogen, carbon monoxide, and sometimes a small amount of carbon dioxide.

The first step of the process is to react methanol and ethanol to produce propanol, isobutanol, and n-butanol. The reactions are listed below:

$$CH_3OH + C_2H_5OH \rightarrow C_3H_7OH + H_2O \qquad (1)$$

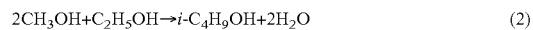
$$2CH_3OH + C_2H_5OH \rightarrow i\text{-}C_4H_9OH + 2H_2O \qquad (2)$$

$$2C_2H_5OH \rightarrow n\text{-}C_4H_9OH + H_2O \qquad (3)$$

The products of the first reaction can be separated into one or more streams comprising methanol, ethanol, propanol, isobutanol, and n-butanol. The separation can be performed in a separation zone. Suitable separation zones include, but are not limited to, an adsorption zone, a distillation zone, a condensation zone, and combinations thereof.

The methanol stream and/or an ethanol stream, or a combined methanol-ethanol stream can be sent to the first reaction zone from the separation zone. The propanol stream can be sent to the second reaction zone. The isobutanol stream can be recovered as a product, and the n-butanol can be recovered as a byproduct.

The reactions of propanol and syngas in the second reaction zone are shown below:

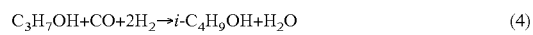
$$C_3H_7OH + CO + 2H_2 \rightarrow i\text{-}C_4H_9OH + H_2O \qquad (4)$$

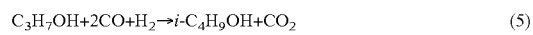
$$C_3H_7OH + 2CO + H_2 \rightarrow i\text{-}C_4H_9OH + CO_2 \qquad (5)$$

Methanol is also produced from the syngas in the second reaction zone:

$$CO + 2H_2 \rightarrow CH_3OH \qquad (6)$$

The methanol is used as a feed in the first reaction zone, along with ethanol.

The products of the second reaction zone can be separated in a gas-liquid separation zone into a gas stream comprising $H_2$, CO, $CO_2$, $CH_4$, and light hydrocarbons and a liquid stream comprising methanol, ethanol, isobutanol and n-butanol. The unreacted CO and $H_2$ can be separated from the gas stream and recycled to the second reaction zone as at least a portion of the syngas stream. The $CH_4$ and light hydrocarbons may be burned to provide energy for the reaction process.

The liquid stream comprises mixed alcohols which are separated in a separation zone. In one embodiment, the liquid bottom stream is separated into separate streams of methanol, ethanol, propanol, isobutanol and n-butanol. Each stream may comprise at least 50% of the specific alcohol(s), or at least 60%, or at least 70%, or at least 80%, or at least 85%, or at least 90%, or at least 95%, or at least 98%, or at least 99%.

In some embodiments, the liquid stream is separated in the same separation zone as the first reaction mixture. In other embodiments, the liquid stream is separated in a different separation zone. Suitable separation zones include, but are not limited to, adsorption zones, distillation zones, condensation zones, and combinations thereof.

At least a portion of the methanol and/or ethanol for the first reaction is produced in the second reaction. At least a portion of the propanol for the second reaction is produced in the first reaction.

Methanol and/or ethanol from the first and/or second separation zone can be introduced into the first reaction zone. Propanol from the first and/or second separation zone can be introduced into the second reaction zone. Syngas from the gas-liquid separator can be introduced into the second reaction zone.

Any catalyst suitable for the reaction of methanol and ethanol to form propanol can be used. Suitable catalysts include, but are not limited to, catalysts comprising at least one element from Groups IA, IIA, IIIA, IVA, VA, IV, IB, IIB, VIB, VIIB, or VIIIB in the Periodic Table, and combinations thereof. In some embodiments, suitable first catalysts comprise at least one of: MgO, MgO—$Al_2O_3$, CuO—MgO—$Al_2O_3$, Mg—$PO_4$, Ca—$PO_4$, Sr—$PO_4$, alkali oxide doped zeolites, and combinations thereof.

Suitable reaction conditions for the first reaction comprise at least one of: a temperature in a range of about 100° C. to about 500° C.; a pressure in a range of about 0.1 to about 15 MPa; 0.1-99 mol % methanol and 0.1-99 mol % ethanol; or a gas hourly space velocity in a range of about 100 to about 300,000 liters of gas per kg of catalyst per hr (L/kg-h).

Any catalyst suitable for the reaction of propanol and syngas to form isobutanol can be used. Second catalysts include but are not limited to: at least one element from Cu, Ag, Au, Zn, Rh, Pd, Pt, Cr, Mn, Fe, Co, Ni, Al, Si, Zr, or Ti; alkali oxides and salts; alkaline earth oxides and salts; rare earth oxides and salts; and combinations thereof. Suitable second catalysts comprise at least one of alkali oxide promoted Cu catalysts, alkali oxide promoted Zn catalysts, alkali oxide promoted Pd catalysts, and combinations thereof. One example of a suitable catalyst is a K/CuZnAl oxide based catalyst.

Suitable second reaction conditions comprise at least one of: a temperature in a range of about 200° C. to about 500° C.; a pressure in a range of about 0.1 to about 30 MPa; 0.1-50 mol % propanol and balance syngas with a ratio of $H_2$ to CO in a range of about 5:1 to about 1:5; or a gas hourly space velocity in a range of about 100 to about 500,000 liters of gas per kg of catalyst per hr (L/kg-h).

One aspect of the invention is a process for the production of isobutanol. In one embodiment, the process comprises: reacting methanol with ethanol in a first reaction zone in the presence of a first catalyst under first reaction conditions to produce a first reaction mixture comprising propanol; and reacting the propanol with synthesis gas in a second reaction zone in the presence of a second catalyst under second reaction conditions to produce a second reaction mixture comprising isobutanol.

In some embodiments, the process further comprises: separating the first reaction mixture in a first separation zone into a propanol stream comprising the propanol, an isobutanol stream comprising isobutanol, an n-butanol stream comprising n-butanol, and either a methanol stream comprising methanol and an ethanol stream comprising ethanol, or a combined methanol-ethanol stream comprising methanol and ethanol; and separating the second reaction mixture in a gas-liquid separation zone into a gas stream comprising $H_2$, CO, $CO_2$, $CH_4$, and light hydrocarbons and a liquid stream comprising methanol, ethanol, propanol, isobutanol and n-butanol.

In some embodiments, the process further comprises at least one of: introducing at least one of the methanol stream, the ethanol stream, or the combined methanol-ethanol stream to the first reaction zone; and introducing the propanol stream to the second reaction zone.

In some embodiments, the first separation zone comprises an adsorption zone, a distillation zone, or a condensation zone.

In some embodiments, the process further comprises: separating the liquid stream from the gas-liquid separation zone in the first separation zone.

In some embodiments, the process further comprises: separating the liquid stream from the gas-liquid separation zone in a second separation zone into a second propanol stream comprising propanol, a second isobutanol stream comprising isobutanol, a second n-butanol stream comprising n-butanol, and either a second methanol stream comprising methanol and a second ethanol stream comprising ethanol, or a second combined methanol-ethanol stream comprising methanol and ethanol.

In some embodiments, the process further comprises at least one of: introducing at least one of the second methanol stream, the second ethanol stream, or the second combined methanol-ethanol to the first reaction zone; and introducing the second propanol stream to the second reaction zone.

In some embodiments, the second separation zone comprises an adsorption zone, a distillation zone, or a condensation zone.

In some embodiments, the process further comprises: separating the gas stream into a recycle synthesis gas stream comprising CO and $H_2$, and a second gas stream comprising $CO_2$, $CH_4$, light hydrocarbons; and introducing the recycle synthesis gas stream to the second reaction zone.

In some embodiments, the first catalyst comprises at least one element from Groups IA, IIA, IIIA, IVA, VA, IV, IB, IIB, VIB, VIIB, or VIIIB in the Periodic Table, and combinations thereof.

In some embodiments, the first catalyst comprises at least one of: MgO, MgO—$Al_2O_3$, CuO—MgO—$Al_2O_3$, Mg—$PO_4$, Ca—$PO_4$, Sr—$PO_4$, alkali oxide doped zeolites, and combinations thereof.

In some embodiments, the second catalyst comprises: at least one element from Cu, Ag, Au, Zn, Rh, Pd, Pt, Cr, Mn, Fe, Co, Ni, Al, Si, Zr, or Ti; alkali oxides and salts; alkaline earth oxides and salts; rare earth oxides and salts; and combinations thereof.

In some embodiments, the second catalyst comprises at least one of alkali oxide promoted Cu catalysts, alkali oxide promoted Zn catalysts, or alkali oxide promoted Pd catalysts, or combinations thereof.

In some embodiments, the second catalyst comprises a K/CuZnAl oxide based catalyst.

In some embodiments, the first reaction conditions comprise at least one of: a temperature in a range of about 100° C. to about 500° C.; a pressure in a range of about 0.1 to about 15 MPa; 0.1-99 mol % methanol and 0.1-99 mol % ethanol; or a gas hourly space velocity in a range of about 100 to about 300,000 liters of gas per kg of catalyst per hr (L/kg-h).

In some embodiments, the second reaction conditions comprise at least one of: a temperature in a range of about 200° C. to about 500° C.; a pressure in a range of about 0.1 to about 30 MPa; 0.1-50 mol % propanol and balance syngas with a ratio of $H_2$ to CO in a range of about 5:1 to about 1:5; or a gas hourly space velocity in a range of about 100 to about 500,000 liters of gas per kg of catalyst per hr (L/kg-h).

Another aspect of the invention is a process for the production of isobutanol. In one embodiment, the process comprises: reacting methanol with ethanol in a first reaction zone in the presence of a first catalyst under first reaction conditions to produce a first reaction mixture comprising propanol; separating the first reaction mixture in a first separation zone into a propanol stream comprising the propanol, an isobutanol stream comprising isobutanol, an n-butanol stream comprising n-butanol, and either a methanol stream comprising methanol and an ethanol stream comprising ethanol, or a combined methanol-ethanol stream comprising methanol and ethanol; reacting the propanol with synthesis gas in a second reaction zone in the presence of a second catalyst under second reaction conditions to produce a second reaction mixture comprising isobutanol; separating the second reaction mixture in a gas-liquid separation zone into a gas stream comprising $H_2$, CO, $CO_2$, $CH_4$, and light hydrocarbons and a liquid stream comprising methanol, ethanol, propanol, isobutanol and n-butanol; and at least one of: introducing at least one of the methanol stream, the ethanol stream, or the combined methanol-ethanol stream to the first reaction zone; and introducing the propanol stream to the second reaction zone.

In some embodiments, the process further comprises: separating the liquid stream from the gas-liquid separation zone in the first separation zone.

In some embodiments, the process further comprises: separating the liquid stream from the gas-liquid separation zone in a second separation zone into a second propanol stream comprising propanol, a second isobutanol stream comprising isobutanol, a second n-butanol stream comprising n-butanol, and either a second methanol stream comprising methanol and a second ethanol stream comprising ethanol, or a second combined methanol-ethanol stream comprising methanol and ethanol.

In some embodiments, the process further comprises at least one of: introducing at least one of the second methanol stream, the second ethanol stream, or the second combined methanol-ethanol to the first reaction zone; introducing the second propanol stream to the second reaction zone; separating the gas stream into a recycle synthesis gas stream comprising CO and $H_2$, and a second gas stream comprising $CO_2$, $CH_4$, light hydrocarbons; and introducing the recycle synthesis gas stream to the second reaction zone.

FIG. 1 illustrates one embodiment of the process 100. Methanol feed stream 105 and ethanol feed stream 110 are sent to the first reaction zone 115.

The first reaction zone 115 contains a first catalyst for the reaction of methanol and ethanol to form propanol, as described above. Suitable reaction conditions for the first reaction zone are given above.

The first reaction mixture 120 from the first reaction zone 115 is sent to a first separation zone 125 where it is separated into one or more of a methanol stream, an ethanol stream, or a combined methanol-ethanol stream 130, a propanol stream 135, an isobutanol stream 140, and a n-butanol stream 145. The methanol stream may comprise at least 50% methanol, or at least 60%, or at least 70%, or at least 80%, or at least 85%, or at least 90%, or at least 95%, or at least 98%, or at least 99%. The ethanol stream may comprise at least 50% ethanol, or at least 60%, or at least 70%, or at least 80%, or at least 85%, or at least 90%, or at least 95%, or at least 98%, or at least 99%. The combined methanol-ethanol stream 130 may comprise at least 50% methanol, or at least 60%, or at least 70%, or at least 80%, or at least 85%, or at least 90%, or at least 95%, or at least 98%, or at least 99%. The propanol stream 135 may comprise at least 50% propanol, or at least 60%, or at least 70%, or at least 80%, or at least 85%, or at least 90%, or at least 95%, or at least 98%, or at least 99%. The isobutanol stream 140 may comprise at least 50% isobutanol, or at least 60%, or at least 70%, or at least 80%, or at least 85%, or at least 90%, or at least 95%, or at least 98%, or at least 99%. The n-butanol stream 145 may comprise at least 50% n-butanol, or at least 60%, or at least 70%, or at least 80%, or at least 85%, or at least 90%, or at least 95%, or at least 98%, or at least 99%.

The methanol stream and/or the ethanol stream, or the combined methanol-ethanol stream 130 are sent to the first reaction zone 115.

The propanol stream 135 is sent to the second reaction zone 150 along with syngas stream 155. The second reaction zone 150 contains a second catalyst for the reaction of propanol and syngas to form isobutanol. The catalysts and reaction conditions are given above.

The second reaction mixture 160 from the second reaction zone 150 is sent to a gas-liquid separator 165 where it is separated into a gas stream 170 and a liquid stream 175. The gas stream 170 comprises $H_2$, CO, $CO_2$, $CH_4$, and light hydrocarbons and the liquid stream 175 comprises methanol, ethanol, and isobutanol.

The gas stream 170 is sent to a gas separation zone 180 where it is separated into a recycle synthesis gas stream 185 comprising CO and $H_2$, and a second stream 190 comprising $CO_2$, $CH_4$, and light hydrocarbons. The recycle synthesis gas stream 185 is sent to the second reaction zone 150. The second stream 190 is burned to provide energy for the process.

The liquid stream 175 is sent to the first separation zone 125 for separation.

Figure 2:
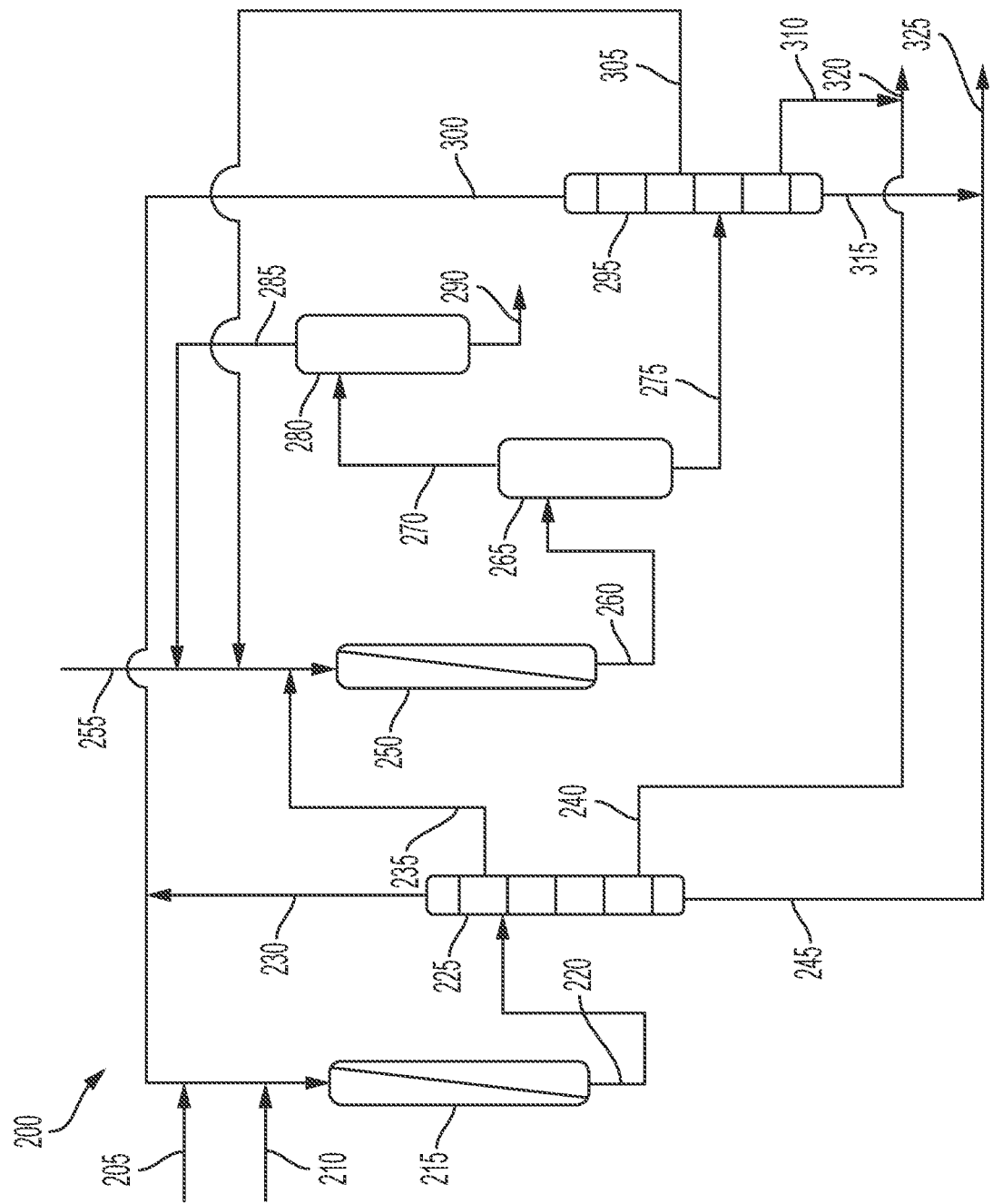
FIG. 2 is an illustration of another embodiment of the process of making isobutanol from methanol, ethanol, propanol, and synthesis gas of the present invention.

FIG. 2 illustrates another embodiment of the isobutanol process 200. Methanol stream 205 and ethanol stream 210 are sent to the first reaction zone 215.

The first reaction zone 215 contains a first catalyst for the reaction of methanol and ethanol to form propanol. The first catalysts and first reaction conditions are as described above.

The methanol and ethanol react to form propanol. The first reaction mixture 220 from the first reaction zone 215 is sent to a first separation zone 225 where it is separated into one or more of a methanol stream, an ethanol stream, or a combined methanol-ethanol stream 230, a propanol stream 235, an isobutanol stream 240, and a n-butanol stream 245.

The methanol stream may comprise at least 50% methanol, or at least 60%, or at least 70%, or at least 80%, or at least 85%, or at least 90%, or at least 95%, or at least 98%, or at least 99%. The ethanol stream may comprise at least 50% ethanol, or at least 60%, or at least 70%, or at least 80%, or at least 85%, or at least 90%, or at least 95%, or at least 98%, or at least 99%. The combined methanol-ethanol stream 230 may comprise at least 50% methanol, or at least 60%, or at least 70%, or at least 80%, or at least 85%, or at least 90%, or at least 95%, or at least 98%, or at least 99%. The propanol stream 235 may comprise at least 50% propanol, or at least 60%, or at least 70%, or at least 80%, or at least 85%, or at least 90%, or at least 95%, or at least 98%, or at least 99%. The isobutanol stream 240 may comprise at least 50% isobutanol, or at least 60%, or at least 70%, or at least 80%, or at least 85%, or at least 90%, or at least 95%, or at least 98%, or at least 99%. The n-butanol stream 245 may comprise at least 50% n-butanol, or at least 60%, or at least 70%, or at least 80%, or at least 85%, or at least 90%, or at least 95%, or at least 98%, or at least 99%.

The methanol stream and/or the ethanol stream, or the combined methanol-ethanol stream 230 is sent to the first reaction zone 215.

The propanol stream 235 is sent to the second reaction zone 250 along with syngas stream 255. The second reaction zone 250 contains a second catalyst for the reaction of propanol and syngas to form isobutanol. Suitable second catalysts and second reaction conditions are as described above.

The propanol and syngas react in the presence of the second catalyst to form isobutanol. The second reaction mixture 260 from the second reaction zone 250 is sent to a gas-liquid separator 265 where it is separated into a gas stream 270 and a liquid stream 275. The gas stream 270 comprises $H_2$, CO, $CO_2$, $CH_4$, and light hydrocarbons and the liquid stream 275 comprises methanol, ethanol, propanol, isobutanol and n-butanol.

The gas stream 270 is sent to a gas separation zone 280 where it is separated into a recycle synthesis gas stream 285 comprising CO and $H_2$, and a second stream 290 comprising $CO_2$, $CH_4$, and light hydrocarbons. The recycle synthesis gas stream 285 is sent to the second reaction zone 250. The second stream 290 is burned and provides energy for the process.

The liquid stream 275 is sent to a second separation zone 295. The liquid stream 275 is separated into one or more of a second methanol stream, a second ethanol stream, or a second combined methanol-ethanol stream 300, a second propanol stream 305, a second isobutanol stream 310, and a second n-butanol stream 315.

The second methanol stream may comprise at least 50% methanol, or at least 60%, or at least 70%, or at least 80%, or at least 85%, or at least 90%, or at least 95%, or at least 98%, or at least 99%. The second ethanol stream may comprise at least 50% ethanol, or at least 60%, or at least 70%, or at least 80%, or at least 85%, or at least 90%, or at least 95%, or at least 98%, or at least 99%. The second combined methanol-ethanol stream 300 may comprise at least 50% methanol, or at least 60%, or at least 70%, or at least 80%, or at least 85%, or at least 90%, or at least 95%, or at least 98%, or at least 99%. The second propanol stream 305 may comprise at least 50% propanol, or at least 60%, or at least 70%, or at least 80%, or at least 85%, or at least 90%, or at least 95%, or at least 98%, or at least 99%. The second isobutanol stream 310 may comprise at least 50% isobutanol, or at least 60%, or at least 70%, or at least 80%, or at least 85%, or at least 90%, or at least 95%, or at least 98%, or at least 99%. The second n-butanol stream 315 may comprise at least 50% n-butanol, or at least 60%, or at least 70%, or at least 80%, or at least 85%, or at least 90%, or at least 95%, or at least 98%, or at least 99%.

The second methanol stream and/or the second ethanol stream, or the second combined methanol-ethanol stream 300 are sent to the first reaction zone 215.

The second propanol stream 305 is sent to the second reaction zone 250.

The second isobutanol stream 310 can be combined with the isobutanol stream 240 from the first separation zone 225 and recovered as product 320.

The second n-butanol stream 315 can be combined with the n-butanol stream 245 from the first separation zone 225 and recovered as byproduct 325.

EXAMPLES

Example 1

A $CuO$—$MgO$—$Al_2O_3$ catalyst was prepared with conventional co-precipitation method. The catalyst had a composition of 0.6% CuO, 60.8% MgO and 38.6% $Al_2O_3$. The catalyst was tested in a tubular reactor under the conditions of 404° C., 1 atm, 7.5% ethanol, 45.5% methanol, balance $N_2$ and gas hourly space velocity of 4,000 ml/g-h. 70% $C_2H_5OH$ conversion and 37% $CH_3OH$ conversion were achieved. The yields of propanol, isobutanol and n-butanol were 75, 89 and 10 g/kg-h, respectively. It is clear that ethanol was converted to propanol, isobutanol and n-butanol by reacting with methanol.

Example 2

A $CuO$—$ZnO$—$Al_2O_3$ catalyst was prepared with conventional co-precipitation method. Next $K_2O$ was impregnated on the surface with incipient wetness impregnation. The catalyst had a composition of 3% $K_2O$, 62% CuO, 25% ZnO and 10% $Al_2O_3$. The catalyst was tested in a tubular reactor under the conditions of 370° C., 100 atm, 43.5% CO, 43.5% $H_2$, 2.7% propanol, balance $N_2$, and gas hourly space velocity of 4,000 ml/g-h. 34% CO conversion and 63% propanol conversion were achieved. The yields of methanol and isobutanol were 94 and 102 g/kg-h, respectively. It is clear that propanol was converted to isobutanol by reacting with syngas, meanwhile methanol was produced in the reactor.

Example 3

A $CuO$—$ZnO$—$Al_2O_3$ catalyst was prepared with conventional co-precipitation method. Next $Cs_2O$ was impregnated on the surface with incipient wetness impregnation. The catalyst had a composition of 3% $Cs_2O$, 62% CuO, 25% ZnO and 10% $Al_2O_3$. The catalyst was tested in a tubular reactor under the conditions of 340° C., 100 atm, 43.5% CO, 43.5% $H_2$, 2.7% propanol, balance $N_2$, and gas hourly space velocity of 4,000 ml/g-h. 48% CO conversion and 82% propanol conversion were achieved. The yields of methanol, ethanol, isobutanol and n-butanol were 155, 15, 122 and 11 g/kg-h, respectively. It is clear that propanol reacted with syngas to produce methanol, isobutanol and small amounts of ethanol and n-butanol.

As used herein, the term "zone" refers to an area including one or more equipment items. A zone may include one or more sub-zones. Equipment items can include one or more reactors or reactor vessels, heaters, exchangers, pipes, pumps, compressors, and controllers, for example. Additionally, an equipment item, such as a reactor, dryer, or vessel, may include one or more zones or sub-zones.

As used herein, the term "about" means with 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for the production of isobutanol comprising:
   reacting methanol with ethanol in a first reaction zone in the presence of a first catalyst under first reaction conditions to produce a first reaction mixture comprising propanol; and
   reacting the propanol with synthesis gas in a second reaction zone in the presence of a second catalyst under second reaction conditions to produce a second reaction mixture comprising isobutanol.

2. The process of claim 1 further comprising:
   separating the first reaction mixture in a first separation zone into a propanol stream comprising the propanol, an isobutanol stream comprising isobutanol, an n-butanol stream comprising n-butanol, and either a methanol stream comprising methanol and an ethanol stream comprising ethanol, or a combined methanol-ethanol stream comprising methanol and ethanol; and
   separating the second reaction mixture in a gas-liquid separation zone into a gas stream comprising $H_2$, CO, $CO_2$, $CH_4$, and light hydrocarbons and a liquid stream comprising methanol, ethanol, propanol, isobutanol and n-butanol.

3. The process of claim 2 further comprising at least one of:
   introducing at least one of the methanol stream, the ethanol stream, or the combined methanol-ethanol stream to the first reaction zone; and
   introducing the propanol stream to the second reaction zone.

4. The process of claim 2 wherein the first separation zone comprises an adsorption zone, a distillation zone, or a condensation zone.

5. The process of claim 2 further comprising:
   separating the liquid stream from the gas-liquid separation zone in the first separation zone.

6. The process of claim 2 further comprising:
   separating the liquid stream from the gas-liquid separation zone in a second separation zone into a second propanol stream comprising propanol, a second isobutanol stream comprising isobutanol, a second n-butanol stream comprising n-butanol, and either a second methanol stream comprising methanol and a second ethanol stream comprising ethanol, or a second combined methanol-ethanol stream comprising methanol and ethanol.

7. The process of claim 6 further comprising at least one of:
   introducing at least one of the second methanol stream, the second ethanol stream, or the second combined methanol-ethanol to the first reaction zone; and
   introducing the second propanol stream to the second reaction zone.

8. The process of claim 6 wherein the second separation zone comprises an adsorption zone, a distillation zone, or a condensation zone.

9. The process of claim 2 further comprising:
   separating the gas stream into a recycle synthesis gas stream comprising CO and $H_2$, and a second gas stream comprising $CO_2$, $CH_4$, light hydrocarbons; and
   introducing the recycle synthesis gas stream to the second reaction zone.

10. The process of claim 1 wherein the first catalyst comprises at least one element from Groups IA, IIA, IIIA, IVA, VA, IV, IB, IIB, VIB, VIIB, or VIIIB in the Periodic Table, and combinations thereof.

11. The process of claim 1 wherein the first catalyst comprises at least one of: MgO, MgO—$Al_2O_3$, CuO—MgO—$Al_2O_3$, Mg—$PO_4$, Ca—$PO_4$, Sr—$PO_4$, alkali oxide doped zeolites, and combinations thereof.

12. The process of claim 1 wherein the second catalyst comprises: at least one element from Cu, Ag, Au, Zn, Rh, Pd, Pt, Cr, Mn, Fe, Co, Ni, Al, Si, Zr, or Ti; alkali oxides and salts; alkaline earth oxides and salts; rare earth oxides and salts; and combinations thereof.

13. The process of claim 1 wherein the second catalyst comprises at least one of alkali oxide promoted Cu catalysts, alkali oxide promoted Zn catalysts, or alkali oxide promoted Pd catalysts, or combinations thereof.

14. The process of claim 1 wherein the second catalyst comprises a K/CuZnAl oxides based catalyst.

15. The process of claim 1 wherein the first reaction conditions comprise at least one of: a temperature in a range of about 100° C. to about 500° C.; a pressure in a range of about 0.1 to about 15 MPa; 0.1-99 mol % methanol and 0.1-99 mol % ethanol; or a gas hourly space velocity in a range of about 100 to about 300,000 liters of gas per kg of catalyst per hr (L/kg-h).

16. The process of wherein the second reaction conditions comprise at least one of: a temperature in a range of about 200° C. to about 500° C.; a pressure in a range of about 0.1 to about 30 MPa; 0.1-50 mol % propanol and balance syngas with a ratio of $H_2$ to CO in a range of about 5:1 to about 1:5; or a gas hourly space velocity in a range of about 100 to about 500,000 liters of gas per kg of catalyst per hr (L/kg-h).

17. A process for the production of isobutanol comprising:
   reacting methanol with ethanol in a first reaction zone in the presence of a first catalyst under first reaction conditions to produce a first reaction mixture comprising propanol;
   separating the first reaction mixture in a first separation zone into a propanol stream comprising the propanol, an isobutanol stream comprising isobutanol, an n-butanol stream comprising n-butanol, and either a methanol stream comprising methanol and an ethanol stream comprising ethanol, or a combined methanol-ethanol stream comprising methanol and ethanol;
   reacting the propanol with synthesis gas in a second reaction zone in the presence of a second catalyst under second reaction conditions to produce a second reaction mixture comprising isobutanol;
   separating the second reaction mixture in a gas-liquid separation zone into a gas stream comprising $H_2$, CO, $CO_2$, $CH_4$, and light hydrocarbons and a liquid stream comprising methanol, ethanol, propanol, isobutanol and n-butanol; and
   at least one of:
   introducing at least one of the methanol stream, the ethanol stream, or the combined methanol-ethanol stream to the first reaction zone; and
   introducing the propanol stream to the second reaction zone.

18. The process of claim 17 further comprising:
   separating the liquid stream from the gas-liquid separation zone in the first separation zone.

19. The process of claim 17 further comprising:
   separating the liquid stream from the gas-liquid separation zone in a second separation zone into a second propanol stream comprising propanol, a second isobutanol stream comprising isobutanol, a second n-butanol stream comprising n-butanol, and either a second methanol stream comprising methanol and a second ethanol stream comprising ethanol, or a second combined methanol-ethanol stream comprising methanol and ethanol.

20. The process of claim 17 further comprising at least one of:
introducing at least one of the second methanol stream, the second ethanol stream, or the second combined methanol-ethanol to the first reaction zone;
introducing the second propanol stream to the second reaction zone;
separating the gas stream into a recycle synthesis gas stream comprising CO and $H_2$, and a second gas stream comprising $CO_2$, $CH_4$, light hydrocarbons; and
introducing the recycle synthesis gas stream to the second reaction zone.

\* \* \* \* \*